US007672877B1

(12) United States Patent
Acton et al.

(10) Patent No.: US 7,672,877 B1
(45) Date of Patent: Mar. 2, 2010

(54) PRODUCT DATA CLASSIFICATION

(75) Inventors: Brian Acton, Saratoga, CA (US); Brian Stolte, San Francisco, CA (US); Rob Solomon, Menlo Park, CA (US); Jeff Weiner, Palo Alto, CA (US); Catherine Cadogan, Santa Clara, CA (US); Matt Heist, San Carlos, CA (US); Manish Baldua, San Jose, CA (US); Charles Arendt, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 466 days.

(21) Appl. No.: 10/789,837

(22) Filed: Feb. 26, 2004

(51) Int. Cl.
*G06F 17/30* (2006.01)

(52) U.S. Cl. .................. 705/27; 705/1; 705/26

(58) Field of Classification Search .................. 705/26, 705/27
See application file for complete search history.

(56) References Cited

U.S. PATENT DOCUMENTS

| | | | | |
|---|---|---|---|---|
| 6,055,515 | A * | 4/2000 | Consentino et al. | 705/27 |
| 6,412,012 | B1 | 6/2002 | Bieganski et al. | |
| 6,438,543 | B1 | 8/2002 | Kazi et al. | |
| 6,578,030 | B1 * | 6/2003 | Wilmsen et al. | 707/3 |
| 6,633,852 | B1 * | 10/2003 | Heckerman et al. | 705/27 |
| 6,697,799 | B1 * | 2/2004 | Neal et al. | 707/3 |
| 6,728,752 | B1 * | 4/2004 | Chen et al. | 709/203 |
| 6,751,600 | B1 * | 6/2004 | Wolin | 706/12 |
| 6,785,671 | B1 | 8/2004 | Bailey et al. | |
| 6,947,936 | B1 * | 9/2005 | Suermondt et al. | 707/7 |
| 7,082,426 | B2 * | 7/2006 | Musgrove et al. | 707/3 |
| 7,086,002 | B2 | 8/2006 | Elo et al. | |
| 7,225,146 | B2 * | 5/2007 | Tenorio | 705/26 |
| 7,319,971 | B2 | 1/2008 | Abrahams et al. | |
| 2001/0044758 | A1 * | 11/2001 | Talib et al. | 705/27 |
| 2002/0055903 | A1 * | 5/2002 | Solomon | 705/37 |
| 2002/0062258 | A1 * | 5/2002 | Bailey et al. | 705/26 |
| 2002/0077930 | A1 * | 6/2002 | Trubey et al. | 705/26 |
| 2002/0184116 | A1 * | 12/2002 | Tam et al. | 705/27 |
| 2003/0101104 | A1 * | 5/2003 | Dimitrova et al. | 705/27 |
| 2003/0120662 | A1 * | 6/2003 | Vishik | 707/100 |
| 2003/0204447 | A1 * | 10/2003 | Dalzell et al. | 705/26 |
| 2004/0015408 | A1 * | 1/2004 | Rauen et al. | 705/26 |

(Continued)

OTHER PUBLICATIONS

Softface: Softface to create structured catalog content for leading school supplier. M2 Presswire. Coventry: May 24, 2001, p. 1-2.*
David D. Lewis. "Naive (Bayes) at forty: The independence assumption in information retrieval". In Claire N'edellec and C'eline Rouveirol, editors, Proceedings of ECML-98, 10th European Conference on Machine Learning, No. 1398, pp. 4-15, Chemnitz, DE, 1998. Springer Verlag, Heidelberg, DE.

*Primary Examiner*—Jason Dunham
(74) *Attorney, Agent, or Firm*—Hickman Palermo Truong & Becker LLP

(57) ABSTRACT

A method and apparatus for associating data with product abstractions is provided. Steps are provided for associating a particular product with a product category, based on a first data set, wherein the first data set includes data that corresponds to an offer to sell the particular product by a particular party and matching the first data set with a product abstraction associated with the product category to which the particular product corresponds.

46 Claims, 6 Drawing Sheets

U.S. PATENT DOCUMENTS

| | | | |
|---|---|---|---|
| 2004/0193591 A1* | 9/2004 | Winter | 707/3 |
| 2005/0149390 A1* | 7/2005 | Scholl et al. | 705/14 |
| 2006/0064411 A1 | 3/2006 | Gross et al. | |
| 2006/0095270 A1* | 5/2006 | Somerville | 705/1 |
| 2006/0095370 A1* | 5/2006 | Seth et al. | 705/40 |
| 2006/0184430 A1* | 8/2006 | Gavarini | 705/26 |
| 2006/0282339 A1 | 12/2006 | Musgrove et al. | |
| 2007/0022021 A1 | 1/2007 | Walker et al. | |

* cited by examiner

PRODUCT DATA CLASSIFICATION

RELATED APPLICATIONS AND PRIORITY CLAIM

This patent application is related to U.S. patent Ser. No. 10/788,537, filed on Feb. 26, 2004, entitled "Associating Product Offerings with Product Abstractions" naming Brian Acton, Brian Stolte, Rob Solomon, Jeff Weiner, Catherine Cadogan, Matt Heist, Manish Baldua, and Charles Arendt as inventors, the entire contents of these prior applications are hereby incorporated by reference in their entirety for all purposes.

This patent application is related to U.S. patent application Ser. No. 10/789,839, filed on Feb. 26, 2004, entitled "Scoring Mechanism Selection Along Multiple Dimensions" naming Brian Acton, Brian Stolte, Rob Solomon, Jeff Weiner, Catherine Cadogan, Matt Heist, Manish Baldua, and Charles Arendt as inventors, the entire contents of these prior applications are hereby incorporated by reference in their entirety for all purposes.

FIELD OF THE INVENTION

The present invention relates to product data classification. The invention specifically relates to associating product offerings with product abstractions.

BACKGROUND OF THE INVENTION

It is becoming increasingly common for shoppers to search for the particular product in which they are interested using electronic search mechanisms, such as Internet-based search engines. The complex systems used by such electronic search mechanisms to process incoming product data from multiple merchants and deliver that product data in the form of search results to millions of customers must ensure that customers receive the best information available. In order to do this, product offering information, data that represents an offer to sell a particular product by a particular party, must be obtained from multiple sources and stored in a way that allows the product offerings to be easily searched.

One approach that may be used by search mechanisms to select which product offering information to include in search results for a search query is referred to herein as the "keyword approach". The key word approach returns those product offerings that contain the keywords contained in submitted queries. Key word searches have a problem in that they may only match data that have exact matches of the words in the product offering. This excludes similar products if they do not match the key words.

A Bayesian classifier approach overcomes the requirement of exact keyword matching by providing an estimate for the likelihood that a particular product offering satisfies a query. More details about Bayesian classifiers may be found in David D. Lewis. "Naive (Bayes) at forty: The independence assumption in information retrieval". In Claire N'edellec and C'eline Rouveirol, editors, Proceedings of ECML-98, 10th European Conference on Machine Learning, number 1398, pages 4-15, Chemnitz, DE, 1998. Springer Verlag, Heidelberg, Del.

In general, Bayesian classifiers are, mathematically speaking, a network of interconnected nodes that are trained on known data (product offering data with known classifications) to predict the likelihood that an input product offering is associated with a given output classification. A problem with the Bayesian classifier approach is that it does not utilize the interrelationships among disparate product offerings for the same or similar products from one or more merchants.

In another approach, the product association approach, multiple product offerings for the same product are grouped together once the data for those product offerings is retrieved. This approach simplifies query response preparation in that it utilizes the interrelationships among disparate product offerings for the same product from one or more merchants. The product association approach has a problem, however, in that it does not utilize the interrelationships among disparate product offerings for similar, non-identical products from one or more merchants. Consider, for example, a merchant A offering to sell a signed, first edition copy of Fitzgerald's "The Great Gatsby" ("A's Gatsby product offering"). A product association approach would associate A's Gatsby product offering with a product offering for a signed, first edition copy of "The Great Gatsby" from merchant B, but would not, however, associate A's Gatsby product offering with merchant C's product offering of a signed, first edition copy of Fitzgerald's "Tender is the Night".

Therefore, based on the foregoing, it is clearly desirable to provide a mechanism that overcomes the problems of needing exact matches of key words from the query, not utilizing the interrelationships among product offerings for the same product from multiple merchants, and not utilizing the interrelationships among product offerings for the similar products from the same or different merchants.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
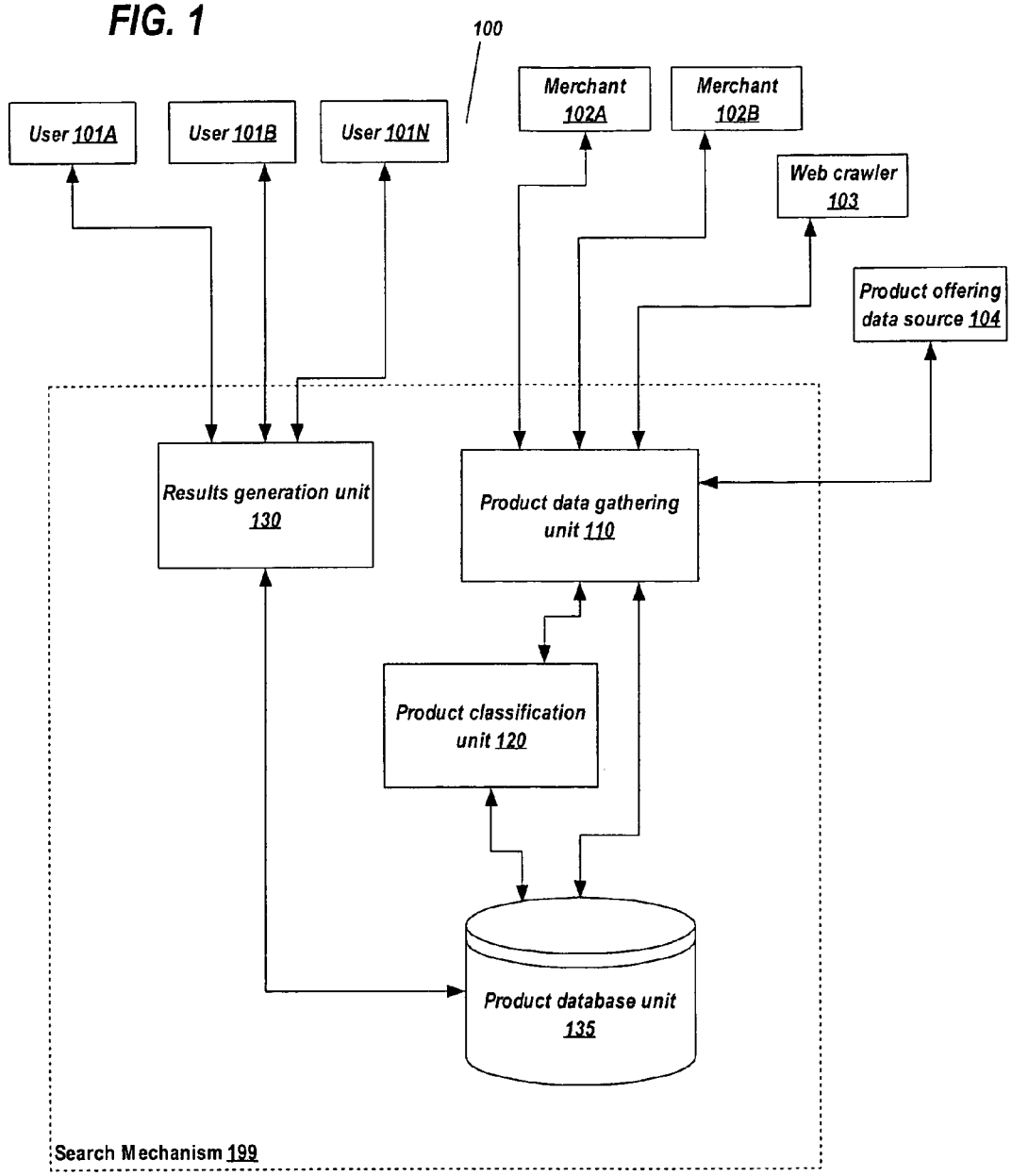
FIG. 1 is a block diagram of a search mechanism according to one embodiment of the invention.

A method and apparatus for associating data with product abstractions is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0 General Overview

As mentioned above, one problem encountered by Internet-based search mechanisms is the ability to provide all of the product offerings in which a particular searcher may be interested. Techniques are described herein for providing search results based on product abstractions and product categories rather than on particular products. As shall be described in greater detail below, the techniques generally involve gathering electronic information about product offerings from numerous sources, determining a general product category for each one of the offerings, and based at least in part on the general category that has been determined for each offering, identifying one or more product abstractions for that offering. After an association between the product offerings and the product abstractions has been established, then the search mechanism is able to provide search results based on that relationship and based on the general product category.

The mappings also enable the search mechanism to charge parties associated with particular product offerings based on the categories to which a product offering was mapped. For example, when a shopper submits a query related to a specific product X, the search mechanism may pull up product offerings for that product X and a similar product Y assuming that the product abstractions for X and for Y have been associated with the same broad product category. In addition, the search mechanisms may charge the parties associated with offerings X and Y based on the product category.

Consider the previous example of A's Gatsby product offering. A shopper submitting a query to the search mechanism to request information for a signed, first edition copy of Fitzgerald's "The Great Gatsby" would get as part of the results both A's Gatsby offering and merchant C's product offering of a signed, first edition copy of Fitzgerald's "Tender is the Night", since the two offerings were both associated with an Autographed by Fitzgerald product category. The search mechanism may also charge A and C a fee for inclusion the result set produced based on that product category.

Various novel techniques are described herein for performing electronic searches based on product offerings. For the sake of clear understanding, an example embodiment is described below. Specifics and possible alternatives are given as part of the example embodiment. These specific details in no way limit the invention that is described fully by the claims, but instead provide illustrations intended to aid understanding.

2.0 Product Abstractions

A product abstraction is an abstract electronic representation of a product. In many cases a product abstraction is one or more records in a database or information in a flat file stored in XML, HTML, character-delimited, or any other appropriate format. In the example given below, a product abstraction is a record in a product database. The data contained in a product abstraction includes one or more fields that describe the product. For example, a product abstraction of a laptop may be a row in a database containing the central processing unit (CPU) speed, the hard drive capacity, the screen size, and the a description of the network card.

3.0 System Overview

FIG. 1 is a block diagram of a search mechanism according to one embodiment of the invention. Techniques are described hereafter for associating product offerings with product abstractions. These techniques enable a broader system which may include, but neither must include nor is limited to the following components:

- one or more users 101A, 101B, 101N that submit queries to the results generation engine 130 and receive results based on those queries
- one or more merchants 102A, 102B that submit or make available product offering data to the product offering data gathering unit 110;
- one or more web crawlers 103 which collect product offering data which is made available to the product offering data gathering unit 110;
- one or more product offering data sources 104, which are any electronic sources of product offering data for the product offering data gathering unit 110; and
- a search mechanism 199 comprising:
  - a product offering data gathering unit 110 for bringing data into the system;
  - a product classification unit 120 for associating product offerings with product categories and product abstractions;
  - a product database unit 135 for storing information related to product offerings, merchants, product categories, product abstractions and the mappings among them; and
  - a results generation engine 130 for producing results based on user queries and items in the product database unit 135.

The various components of the search mechanism 199, including the product offering data gathering unit 110, the product classification unit 120, the results generation engine 130, and the product database unit 135 are described below.

3.1 Product Gathering Unit

The product offering data gathering unit 110 obtains data, corresponding to one or more product offerings, from one or more merchants 102A, 102B, one or more web crawlers 103, and any other appropriate product offering data source 104.

The product offering data gathering unit 110 may obtain data from these sources using any of a number of protocols, including file transfer protocol (FTP), rsync, hypertext transfer protocol (HTTP), secure HTTP (HTTPS), and TCP/IP (transaction control protocol/Internet protocol) sockets. Product offering data may also be provided to the product offering data gathering unit 110 via a machine-readable medium, such as a compact disk (CD). In a related scenario, the product offering data gathering unit 110 may read the product offering data directly from the CD or machine-readable medium. The product offering data on the machine-readable media may be, for example, a product catalog. The product offering data may be in any of a number of formats including hypertext markup language (HTML), extensible markup language (XML), electronic data interchange (EDI), and character-delimited formats. Additionally, a web crawler 103 may collect product offering data from one or more web sites and the product data gathering unit 110 may obtain product data from the web crawler 103 over a network or via a machine-readable medium.

The product data gathering unit 110 may transform a product offering from a first format into a second format. This may be accomplished in many different ways, including parsing the product offering in the first format and writing the data out in the second format. For example, if the product classification unit 120 needs data to be in XML and product data arrives in a comma-delimited file, then the product data gathering unit 110 may parse the comma-delimited file and write the data to another file in XML. Thus, the product classification unit 120 will have the product data in the format it requires.

Each of merchants 102A, 102B generally represents a person or company offering to sell a product. To interact with the product offering data gathering unit 110, a merchant 102A may, for example, upload data associated with a product offering to a website associated with the product offering data gathering unit 110 via HTTP. A web crawler 103 is a set of one or more processes working in concert to gather product offering information from the Internet, a private Intranet, or any other electronic collection of product offering data. Other product offering data sources 104 may be any electronic source of product offering data for the product offering data gathering unit 110. An example product offering data source 104 may be an electronic version of a product catalog provided to the product offering data gathering unit 110 on a compact disk (CD).

3.2 Product Classification Unit

The product classification unit 120 is communicatively coupled to both the product offering data gathering unit 110 and the product database unit 135. The product database unit 135 is also communicatively coupled to the results generation engine 130. In this embodiment, each of these units 110, 120, 130, 135 runs on a separate computer. In alternative embodiments, one or more of these units may be implemented to run on separate processes running on the same computers; one or more units may be implemented to each run on multiple processes; multiple units may be implemented to run within a single process; or all entities in the search mechanism 199 may be implemented as a single process.

The functioning of the product classification unit 120 is described in more detail below. In general, however, the product classification unit 120 matches product offering data obtained by the product offering data gathering unit 110 to one or more of each of the following:

product categories, which are groupings of one or more items, where those items include zero or more product categories, zero or more product abstractions, zero or more product offerings, and zero or more merchants; and product abstractions, which are abstract electronic representations of a product.

The product classification unit 120 stores data associated with the incoming product offering data and the classifications of the product offering data to the product database unit 135. In this embodiment, the product database unit 135 is a relational database. In alternative embodiments, the product database unit 135 may be a flat file a Lightweight Directory Access Protocol (LDAP) directory, or another appropriate storage mechanism.

3.3 Results Generation Unit

The functioning of the results generation unit 130 is described in more detail below. In general, however, it produces results for users 101A, 101B, 101N based on queries from the users 101A, 101B, 101N, and based on the data and mappings in the product database unit 135. The users 101A, 101B, 101N may be human operators or automated processes. These users 101A, 101B, 101N may communicate with the results generation unit 130 via HTTP, XML, HTTPS, FTP, rsync, or TCP/IP sockets, or any other appropriate communication mechanism in any appropriate format (XML, HTML, etc.). For example, a human user 101A submits a search query in HTML to a website associated with a results generation engine 130, which processes the query and produces results based on data and links in the product database unit 135 and returns results to the user in XML.

4.0 Functional Overview

4.1 Associating Product Offerings with Product Categories

One of the operations of the embodiment described above is to associate the data obtained by the product offering data gathering unit 110 with product categories stored in the product database unit 135.

Figure 2:
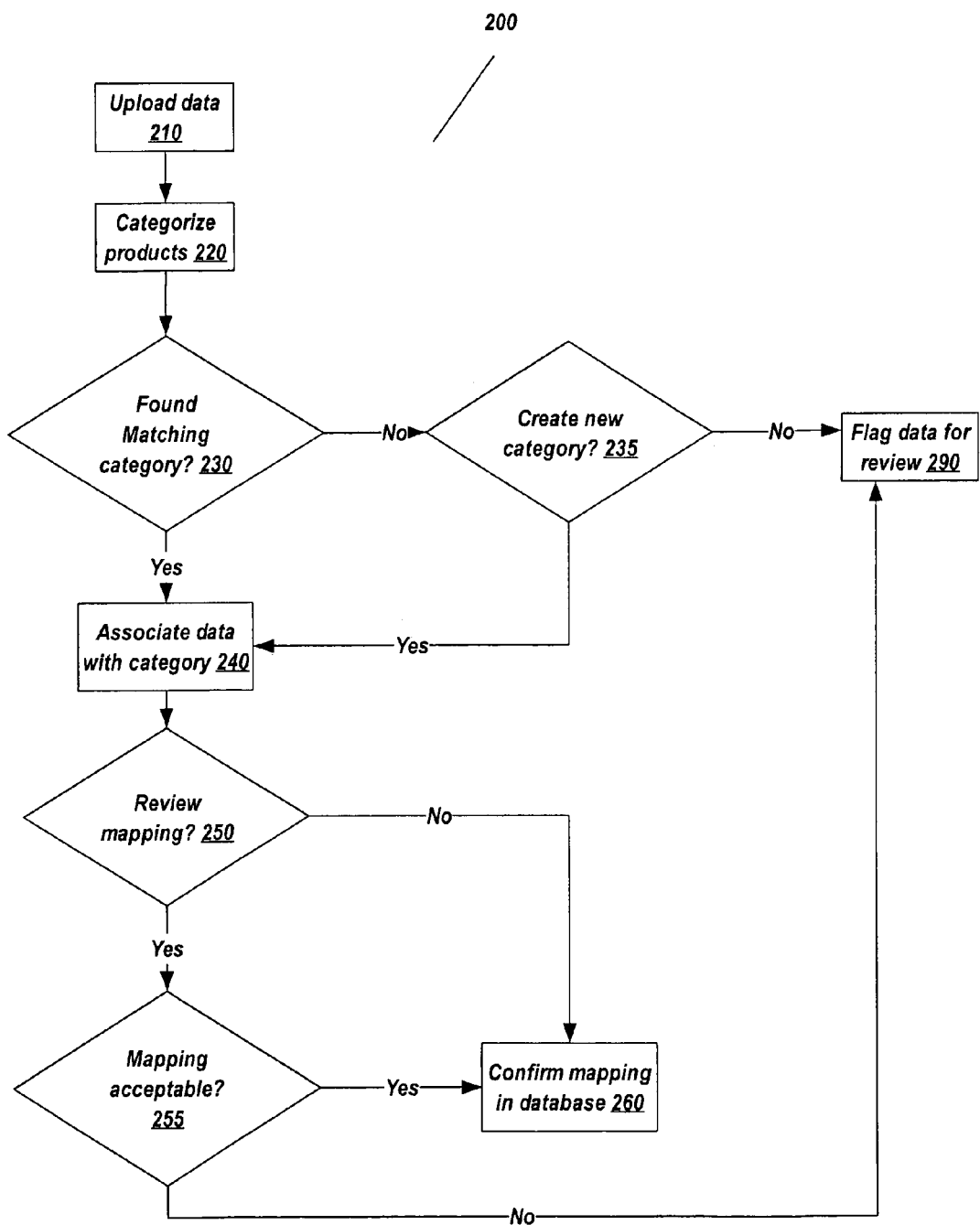
FIG. 2 is a flow diagram that illustrates a process for associating data with product categories.

FIG. 2 is a flow diagram that illustrates a process 200 for associating data with product categories. The first step, step 210, in such a process is uploading the data to the product offering data gathering unit 110. For example, a merchant 102A uploads product offering data relating an offer to sell a signed, first edition copy of Fitzgerald's "The Great Gatsby" ("Gatsby product offering"). This data may be uploaded in any number of ways: the merchant 102A may upload the data to a website associated with the product offering data gathering unit 110; the merchant 102A may submit a URL associated the merchant's 102A website to the product offering data gathering unit 110 which would then process the data from the URL finding the Gatsby product offering and, possibly, other product offerings within the site; or the data may be made available to the product offering data gathering unit 110 in any number of formats including HTML, XML, EDI, or character-delimited on a CD or machine-readable medium, over a network, or via any other appropriate communication mechanism.

The data may also be obtained from a web crawler 103 or an electronic product offering data source 104. A web crawler 103 is a process that gathers data from the Internet. This data may be loaded into the product offering data gathering unit 110 using any appropriate communication mechanism and any appropriate format. An electronic product offering data source 104 may also be the source of data for the product offering data gathering unit 110. In such a case, the product offering data source makes available to product offering data gathering unit 110, either on CD, a machine-readable medium, or via a network, data associated with one or more product offerings in a any appropriate format such as HTML, XML, EDI, character-delimited, or fixed-width formats.

Once the data is uploaded in step 210, an attempt is made to associate product offering data found in the uploaded data to an existing product category (step 220). For example, the product classification unit 120 attempts to map the Gatsby product offering uploaded in step 210 to a number of categories by using a Bayesian classifier to find the most probable product category matches for the product offering. Any appropriate algorithm may be used to find matching categories for the product offering, including key word matching, or using an identifier based on one or more of Universal Product Code (UPC), International Standard Book Number (ISBN), manufacturer, manufacturer's part number, and model number. It is also possible that a human operator categorizes the data.

In step 230, a check for matching categories is made. If no matching categories are found, then in step 235 a decision is made whether to create a new category. For example, if no matching category is found for the Gatsby product offering, the product classification unit 120 makes a decision whether to create a new product category based on, for example, whether other similar uncategorized products exist in the system 100. There are numerous other possible factors which may also be considered when deciding whether to create a new product category including the number of similar, extant product categories and various characteristics of the merchant such as knowledge of whether the merchant often creates innovative products which are not in pre-existing categories.

Creation of a product category from a product offering may be accomplished in a number of ways. For example, the product classification unit 120 may construct a new product category from a product offering by including in the new product category only the information from the product offering that is immutable in the new product category. For example, the product classification unit 120 may create a Fitzgerald product category based on the Gatsby product offering by selecting the author name, "F. Scott Fitzgerald", from the Gatsby product offering. This Fitzgerald product category may then have mapped to it the Gatsby product offering and any other product offering with the author "F. Scott Fitzgerald".

If a product category is created as part of step 235 or a matching category is found in step 230, then the product offering uploaded in step 210 is associated with that product category. For example, the Gatsby product offering is associated with an Autographed Books product category which was found in step 220. Alternatively, the Gatsby product offering may be associated with a Fitzgerald's Books category created in step 235.

If a new category is not created in step 235, then the data is flagged for review in step 290. For example, the Gatsby product offering is flagged for review in step 290 by storing the data in the product database unit 135 and writing a reference to that data in the product database unit 135 in a table of uncategorized data. Subsequently, a human operator may review the data in the table of uncategorized data in the product database unit 135 and choose to associate the Gatsby product offering with a First Edition Books product category. Alternatively, the data may be flagged for review by writing the data and/or a reference to the data to a flat file, a database, or any appropriate machine-readable medium. It is also possible that flagging for review is performed by sending a rejection report describing the failure to match the product offering to a product category to a party associated with the unmatched product offering.

Once the data is associated with a product category in step 240, a decision is made whether to review the mapping in step 250. In some cases the categorization of a product offering will be fairly certain and there will be no need to review the mapping, and the mapping will be confirmed in the database in step 260. In other cases, however, the mapping of a product offering to a product category will be less certain and will need to be reviewed, step 255. For example, the method for determining if the mapping needs to be reviewed may be comparing the score produced by the Bayesian classifier to a predetermined threshold for acceptability. For example, if the Gatsby product offering had a high enough association with a used books category to be considered a matching category in step 230, but not high enough to be automatically confirmed in the product database unit 135, then the mapping would be reviewed in step 255.

In this example, the review of a mapping in step 255 is performed by a human operator who decides whether to confirm the mapping in the database 260 or flag the data for review 290. This decision may also be made automatically based on:

the merchant: certain merchants may have eclectic products which are harder to categorize and, therefore, would be more likely to have a low matching score between the product offering and product category;

the product category: certain broad or catchall categories may have lower thresholds for acceptable matching scores;

density of product categories: if the product category with which a product offering is being associated is one of many similar product categories, then the product category may have higher thresholds for matching scores; or the one or more candidate product categories found in step 220: if there were multiple candidate product categories produced in step 220, then, for example, the product classification unit 120 may decide not to review the categorization and choose to map the product offering to the broadest of the candidate product categories.

As a final step for associating product offerings with product categories, the mapping is confirmed in the database, 260. For example, the step of confirming the mapping in the product database unit 135 includes adding information describing the association of the Gatsby product offering and the First Edition Books product category. This information may then be used by the results generation engine 130 to generate results for user queries.

The product categorization described here enables, among other things, basing the fee (for including a reference to a product offering in a results set) on the product category associated with a product offering and for aiding later mapping of product offerings to product abstractions.

4.2 Associating a Product Offering with a Product Abstraction

One of the operations of the example described herein is to associate the data obtained by the product offering data gathering unit 110 with product abstractions stored in the product database unit 135.

Figure 3:
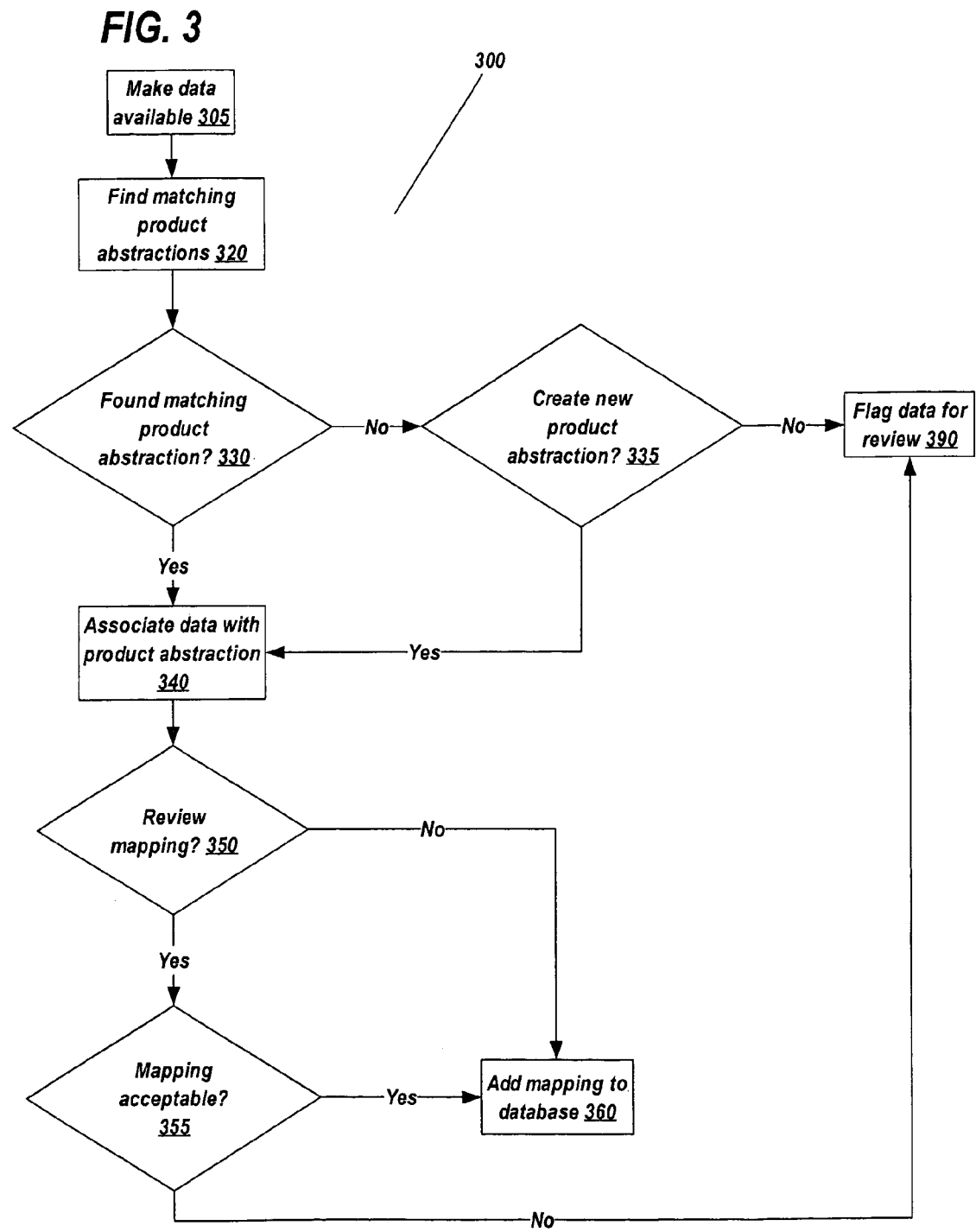
FIG. 3 is a flow diagram that illustrates a process for associating data with a product abstraction.

FIG. 3 is a flow diagram that illustrates a process 300 for associating product offerings with product abstractions. The first step in such a process is making the data available, 305. For example, after a merchant 102A uploads product offering data relating to the Gatsby product offering and that product offering is associated with a First Edition Books product category, the data is passed to the product classification unit 120 which associates the Gatsby product offering with a product abstraction. In alternate embodiments a separate process on the same computer or on a different computer may perform the mapping of product offerings to product abstractions. In those embodiments, the data may be made available to that process over a network, on a machine-readable medium, or any other appropriate communication mechanism and may be in HTML, XML, EDI, character-delimited, or fixed-width formats.

Once the data is made available in step 305, an attempt is made to associate product offering data found in the uploaded data to an existing product abstraction, 320. For example, the product classification unit 120 processes the product offering made available in step 305, comprising the Gatsby product offering, using a Bayesian classifier to find the most probable product abstraction matches for the product offering, based on the product category determined in process 200. Additional matching criteria may also be used including key word matching, or using an identifier based on one or more of Universal Product Code (UPC), International Standard Book Number (ISBN), manufacturer, manufacturer's part number, and model number.

The product category determined in process 200 may be used in a number of ways to help find matching product abstractions. For example, given a mapping of product category to one or more product abstractions, then the choice of product category may be used as an indicator that the product abstractions mapped to that category are more likely to match a product offering mapped to the product category. For example, if the Gatsby product offering is mapped to an Autographed Books product category, then the a higher matching probability score may be associate with an Autographed Copies of "The Great Gatsby" product abstraction, given that the Autographed Copies of "The Great Gatsby" product abstraction is mapped to the Autographed Books product category. In other examples, the product categories mapped to a product offering may be used as a pre-selection filter for candidate product abstractions. For example, a product classification unit 120, in attempting to associate a product offering with a product abstraction, may limit its search of candidate product abstractions to only the product abstractions associated with the product category determined in process 200.

Mappings between product abstractions and product categories may be made in a number of ways. For example, when a new product abstraction is created for a product offering (see step 335 below), a mapping may be made between the newly created product abstraction and the product category determined for the product offering in process 200. Similarly, when a new category is created for a product offering in step 235, a mapping may be made between the newly-created category and the product abstraction selected for the product offering in process 300. In addition, a human operator may create, modify or delete the mappings. The mappings between product abstractions and product categories may be stored into and retrieved from any appropriate machine-readable medium. In this example, the mappings between product abstractions and product categories are stored in the product database unit 135.

If it is determined in step 330 that no matching abstractions were found, then a decision must be made whether to create a new product abstraction in step 335. For example, if no matching abstraction is found for the Gatsby product offering, the product classification unit 120 makes a decision whether to create a new product abstraction based on, for example, whether other similar products, which also have no matching product abstraction, exist in the system 100. There are numerous other possible factors which may also be considered when deciding whether to create a new product abstraction including the number of similar, extant product abstractions and various characteristics of the merchant—such as knowledge of whether the merchant often creates innovative products which are not representable in pre-existing abstraction.

Creation of a product abstraction from a product offering may be accomplished in a number of ways. For example, the product classification unit 120 may construct a new product abstraction from an existing product offering by including in the new product abstraction all information from the existing product offering except price, quantity in stock, shipping price, and any merchant-specific information. In another example, the product abstraction may be made by picking, from the product category determined in process 200, a sample product abstraction. Then the new product abstraction may be created by replacing the data in the sample product abstraction with corresponding data from the product offering. Consider this simple example: a Tender is The Night product abstraction exists in a Fitzgerald's Books product category. The Tender is the Night product abstraction contains only the ISBN for the book. When a product offering for a copy of the Great Gatsby is processed and not mapped to any product abstraction, but is mapped to the Fitzgerald's books category, the product classification unit 120 selects the Tender is the Night product abstraction to use as a sample product abstraction. The product classification unit 120 makes a copy of the sample product abstraction and fills in the ISBN field with the ISBN from the Great Gatsby product offering. This sample product abstraction is now complete and is stored in the product database unit 135 as the Great Gatsby product abstraction.

In another example of creation of a product abstraction from a product offering, a human operator may create a product abstraction based on the product offering by selecting information, from the product offering, to include in the new product abstraction and causing the new product abstraction to be written to the product database unit 135.

If a product abstraction is created as part of step 335 or a matching product abstraction is found in step 330, then the product offering, made available in step 305, is associated with that product abstraction in step 340. For example, the Gatsby product offering is associated with a "The Great Gatsby" product abstraction which was found in step 320. Alternatively, the Gatsby product offering may be associated with a The Great Gatsby, First Edition product abstraction created in step 235.

If a new product abstraction is not created in step 335, then the data is flagged for review, step 390. For example, the Gatsby product offering is flagged for review in step 390 by storing the data in the product database unit 135 and writing a reference to that data in the product database unit 135 in a table of product offerings that may not be matched to product abstractions. Subsequently, a human operator may review the data in the table of unmapped data in the product database unit 135 and choose to associate the Gatsby product offering with the "The Great Gatsby", First Edition product abstraction. Alternatively, the data may be flagged for review by writing the data and/or a reference to the data to a flat file, a database, an LDAP, or any appropriate machine-readable medium. Flagging for review may include sending a rejection report describing the failure to match the product offering to a product abstraction to a party associated with the unmatched product offering.

Once the data is associated with a product abstraction, 340, a decision is made whether to review the mapping 350. In many cases, the mapping of a product offering to a product abstraction will be fairly certain and there will be no need to review the mapping, and the mapping will be confirmed in the database, step 360. In some cases, however, the mapping to a product abstraction will be less certain and will need to be reviewed, step 355. In this embodiment, the method for determining if the mapping needs to be reviewed is to compare the score produced by the Bayesian classifier, which estimates how likely it is that the association of the product offering with the product abstraction is valid, to a predetermined threshold for acceptability. For example, if the Gatsby product offering had a high enough association with a "The Great Gatsby" product offering to be considered a matching product abstraction in step 330, but not high enough to be automatically confirmed in the product database unit 135, then the mapping would be reviewed in step 355.

The review of a mapping in step 355 is performed by a human operator who decides whether to confirm the mapping in the database 360 or flag the data for review 390. Alternatively, this decision may be made automatically based on:

the merchant: certain merchants may have eclectic products for which it is harder to find matching product abstractions and, therefore, would be more likely to have a low matching score between a product offering and a product abstraction;

the product abstraction: certain broader abstractions may have lower thresholds for classification similarity, e.g. a "The Great Gatsby" product abstraction may include all editions of the book, whereas a "The Great Gatsby", First Edition product abstraction is narrower;

density of product abstractions: if the product abstraction with which a product offering is being associated is one of many similar product abstractions, then the abstraction may necessitate higher thresholds for classification similarity; or the one or more candidate abstractions found in step 320: if there were multiple candidate product abstractions produced in step 320, then, for example, the product classification unit 120 may decide not to review the mapping and choose to associate the product offering with the broadest of the candidate abstractions. For example, suppose the product classification unit 120 found equivalent matching scores for two product abstractions for the Gatsby offering: the product classification unit 120 may then choose to map the Gatsby product offering to the "The Great Gatsby" product abstraction instead of to the narrower "The Great Gatsby", First Edition product abstraction.

As a final step for associating product offerings with product abstractions, the mapping is confirmed in the database, 360. For example, the step of confirming the mapping in the product database unit 135 includes adding information describing the mapping of the Gatsby product offering to the "The Great Gatsby", First Edition Books product abstraction. This information may then be used by the results generation engine 130 to generate results for user queries.

Associating product offerings to product abstractions enables numerous things including enabling a results generation engine 130 to generate result sets based on user queries.

4.3 Updating Data in Database

Figure 4:
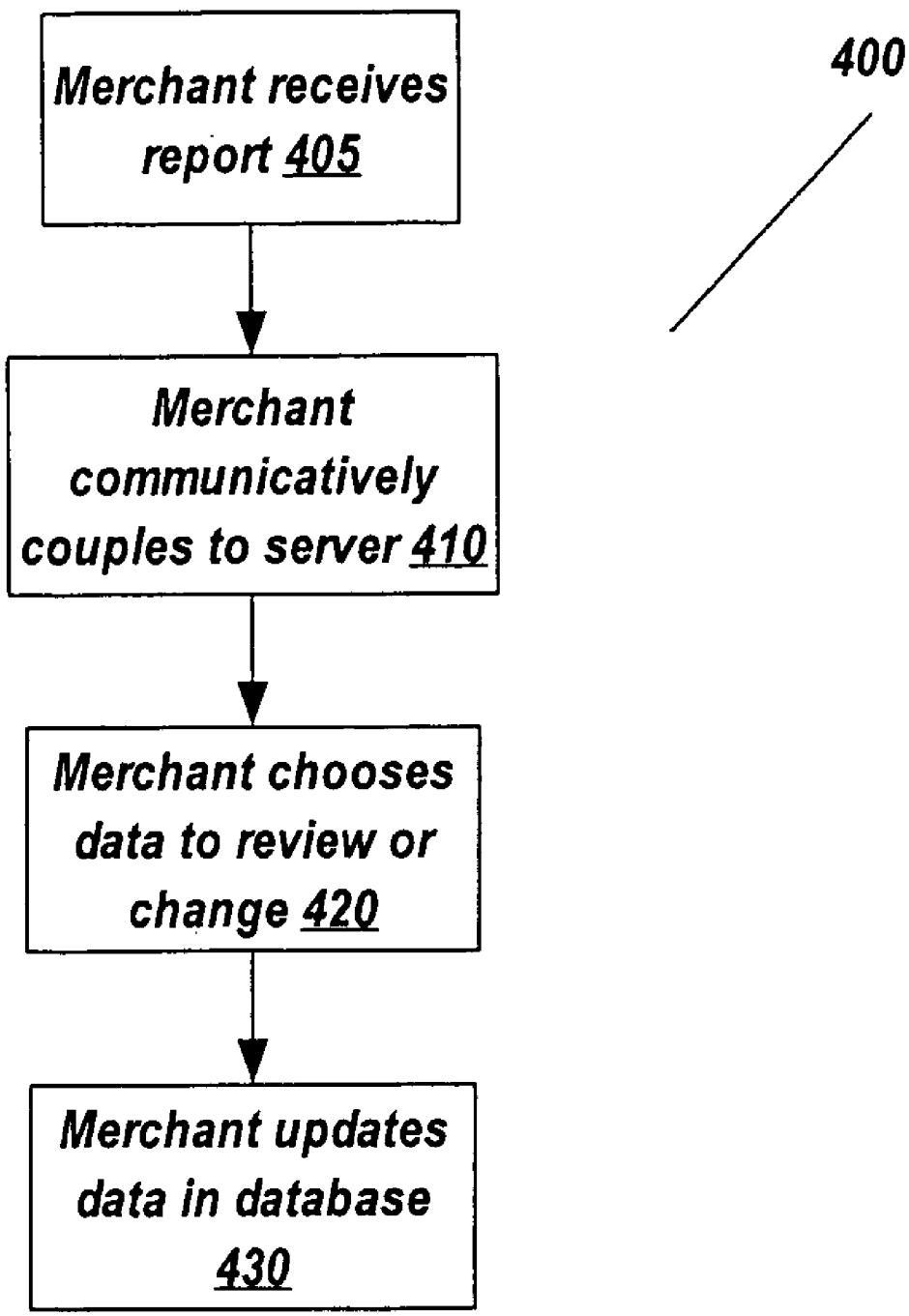
FIG. 4 is a flow diagram that depicts an example process for a merchant to review and update mapping information

In the example herein, merchants may update and change information in the product database unit 135 for their product offerings. FIG. 4 is a flow diagram that depicts a process 400 for a merchant to review and update mapping information, according to one embodiment of the invention.

First, a merchant receives a report, 405. For example, a merchant 102A receives a report via email from the product classification unit 120 that indicates that their Gatsby product offering may be definitively mapped to a product abstraction if the ISBN was provided. The report may be sent in any number of ways, including being displayed to the merchant on a web page when the merchant is logged into a website associated with product classification unit 120, via fax, voicemail, or letter sent to the merchant, or any other appropriate communication mechanism. The reports may include an activity report, a product offering categorization summary report, a data flagging report, or a report to signify what additional data would be needed to map a data set to a product category or product abstraction.

Once the report is received by the merchant in step 405, the merchant communicatively couples to a product classification unit. For example, the merchant 102A logs into a website associated with product classification unit 120 using a user name and password. The merchant may also invoke a web service to communicate with the product classification unit 120 or connect to the above-mentioned website using other means such as typing in a URL or providing security credentials.

Once the merchant is logged into the website associated with a product classification unit 120, the merchant chooses what data to review or change, 420. For example, the merchant 102A browses to a web page that enables modification of the choice of product abstraction associated with the Gatsby product offering. Any method for having the merchant specify which data to alter would suffice, e.g. specifying to a web service a parameter value that specifies what data to alter.

Once the data is chosen, the merchant may update the data, 430. For example, the merchant 102A alters the data associated with the Gatsby product offering so that the data includes an ISBN. With that ISBN, the product classification unit 120 will be able to associate the Gatsby product offering with a Great Gatsby Book product abstraction. This data may be updated by submitting the change via a website communicatively coupled to the product classification unit 120 or by communicating the change to the product classification unit 120 using a web service or any appropriate network protocol in an appropriate format.

4.4 Results Generation

A feature of the embodiment described herein is that results may be generated for a user query based on the mapping information produced by the product classification unit 120. For example, a user 101A submits a query to a website associated with the results generation engine 130 and receives back a set of results.

Figure 5:
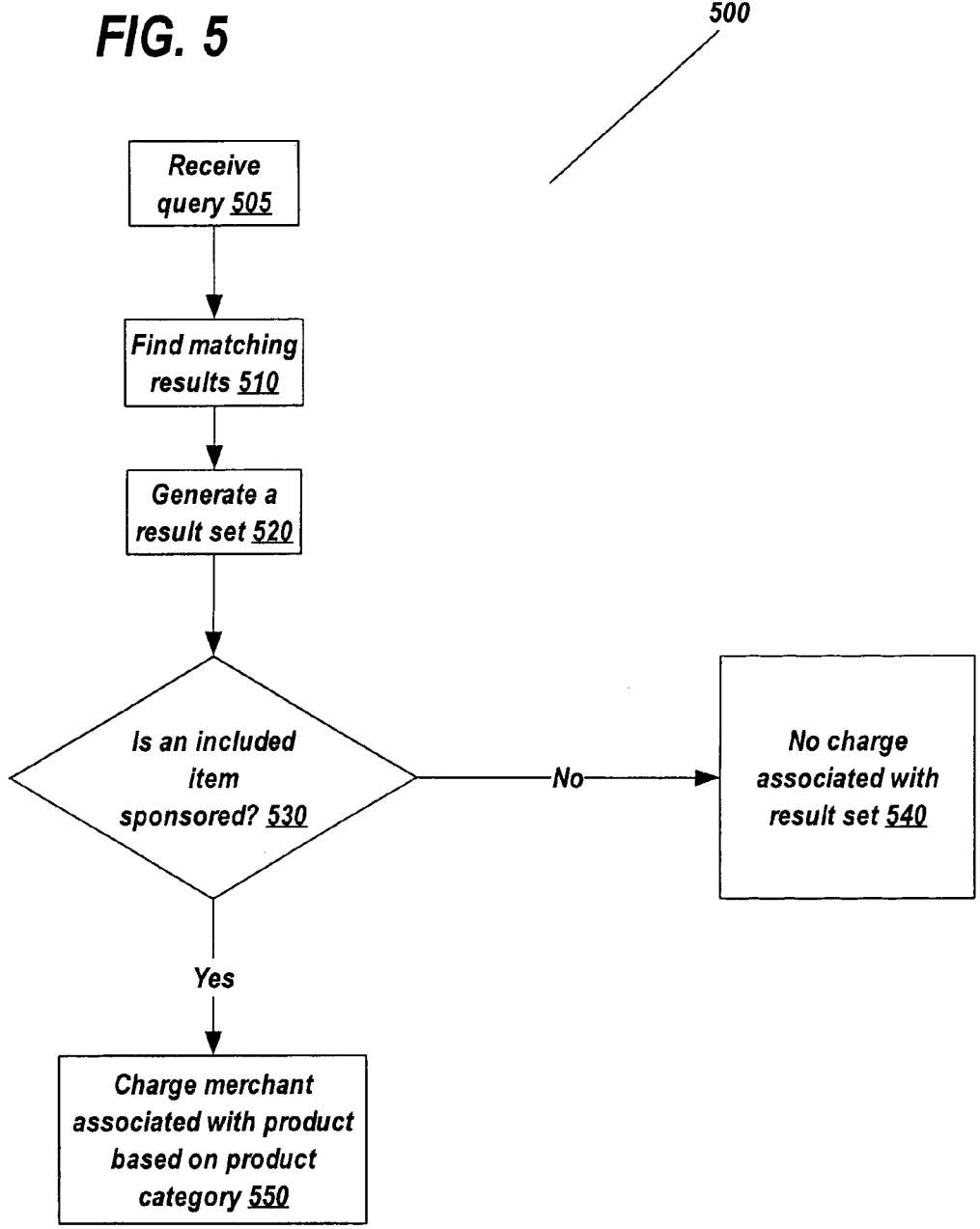
FIG. 5 is a flow diagram that depicts an example process for the generation of results based on a user query.

FIG. 5 is a flow diagram that depicts an example process 500 for the generation of results based on a user query. First, a user query is received, 505. For example, user 101A submits a query to a website associated with the results generation engine 130. The query contains the Boolean phrase "Gatsby AND signed". The query may be submitted to a website in HTML, XML, or any appropriate format. The query may be a Boolean phrase, a keyword search, or any appropriate query format. The query may be submitted via a web service or via FTP, HTTP, HTTPS, rsync, TCP/IP sockets or any appropriate communication protocol.

Queries submitted by users may request a product abstraction comparison grid, a merchant comparison grid, or a product offering comparison grid. A comparison grid displays one or more aspects of one or more items that are displayed on a results page, those items may include merchants, product abstractions, product offerings, and product categories. For example a query is received from a user 101A and requests a product offerings comparison grid for copies of the Great Gatsby by Fitzgerald. This comparison grid displays the edition, cost, shipping cost, and condition of the book.

Once the results generation engine 130 receives the query, it finds matching items in step 510. The process of finding matching items may be any appropriate matching algorithm including Bayesian classification and key word matching, and may be for any or all of the different item types: product offering, product abstractions, product categories, or merchants. In addition, the matching algorithm may find matching items based, at least in part, on the mapping information that specifies correspondence among multiple items. For example, the results generation engine 130 matches the results generated by a query "Gatsby AND signed" for product offerings from user 101A to match a Fitzgerald's "The Great Gatsby" product abstraction ("Gatsby product abstraction") and, using the mapping from the Gatsby product abstraction to corresponding product offerings, the results generation engine determines that there are 4 product offerings mapped to the Gatsby product abstraction and displays as results the Gatsby product offering from merchant 102A as well as 3 other offerings to sell unsigned copies of Gatsby from another merchant 102B.

The results generation engine 130 may find matching items based on a particular item. This may be done in a number of ways. For example, a similarity measure among the particular item and candidate results may help determine what is in the result set. For example, a user 101A selects a "find similar product abstractions" query from a web page displaying a laptop with a 1600×1200 screen, where that web page is associated with the results generation engine 130. The results generation engine 130, upon receiving the query, searches for other laptops with 1600×1200 screens and finds two matching product abstractions: one is a laptop with a 1600×1200 screen and a 2.4 GHz processor and the other is a laptop with a 1600×1200 and a 2.5 GHz processor.

Result sets generated in step 520 for a query may include product offerings, product abstractions, links to merchant websites, or any data included in the product database unit 135. One example of a result set is a product abstraction comparison page, which is a page displaying related features of multiple product abstractions together on a single page. For example, a user 101A, communicatively coupled to a website associated with the results generation engine 130, queries for a product comparison page for laptops with 1600×1200 pixel screens. The results generation engine matches the query to a 1600×1200 Laptop product category, which has a mapping to two product abstractions. The results generation engine 130 produces a HTML product comparison page containing two features, screen size and processor speed, for the two product abstraction for the two laptops: one being a 1600×1200 screen laptop with a 2.4 GHz processor, the other being a 1600×1200 screen laptop with a 2.5 GHz processor. In viewing this page, the user 101A may compare the features of the two laptops side-by-side and see that one has a faster processor than the other. The results sets are usually formatted as a set of HTML or XML hyperlinks in a web page. For example, a set of HTML links to the 4 product offerings for Fitzgerald's Great Gatsby are generated. The result set may also be generated in EDI, character-delimited, or any other appropriate format.

In some types of results sets, e.g. HTML and XML, the references are displayed in a particular order in the result set. The order of display for the list of references in the result set may be determined in any appropriate manner. For example, a function of likelihood that a reference satisfies a query (called "likelihood" here), existence of sponsorship, and cost of sponsorship may be used to determine order. For example, consider a results generation engine 130 that uses the product of likelihood and cost of sponsorship. If two references, reference A, with a likelihood of 75% and a cost of $100, and reference B, with a likelihood of 80% and a cost of $90, then, using the product of likelihood and cost of sponsorship, then reference A (7500) would be listed before reference B (7200).

In order to determine whether to charge the party associated with each item in the result set, it must be determined whether the included item is sponsored, step 530. For example, results generation engine 130 may query the product database unit 135. If an item in the result set is sponsored, then a party associated with the item is charged 550 and that charge is based on the product category. If the item is not sponsored, then no party is charged for the inclusion of a reference to the item in the result set, 540. For example, merchant 102A will be charged a fee for the inclusion of an HTML link to the merchant's 102A offering of the signed, first edition copy of the Great Gatsby, and no party will be charged a fee for the inclusion of an unsponsored link to sell that copy of the Great Gatsby. The charging of a fee may be done via item-by-item invoicing, charging to a credit card, withdrawing from a debit account, or any appropriate charging mechanism.

Another way to determine how much to charge a party sponsoring an item is to have the result generation engine 130, or a process thereto communicatively coupled, monitor the number of times that references to each sponsored item are selected. In such a case, the search mechanism may determine how much to charge a party sponsoring an item based on the product category of the item and based, at least in part, on the number of times that a reference to the item has been selected by a user. For example, a web server associated with the results generation engine 130 monitors the number of times that the users 101A, 101B, 101N select URLs associated with each item in the product database unit 135 and stores this information in the product database unit 135. The amount to charge any particular merchant 102A or 102B would be based on the number of times an item the merchant is sponsoring is selected by any user 101A, 101B, and 101N and based on the product category to which the item is mapped.

The process 500 for generating query results for a user enables the generation of result sets and the detection of sponsored and unsponsored items in a results set, which, in turn, enables, among other things, proper system functioning when there is inclusion of sponsored and unsponsored items in result sets. The process 500 also enables charging of a party associated with an item based at least in part on the product category of that item.

5.0 Hardware Overview

Figure 6:
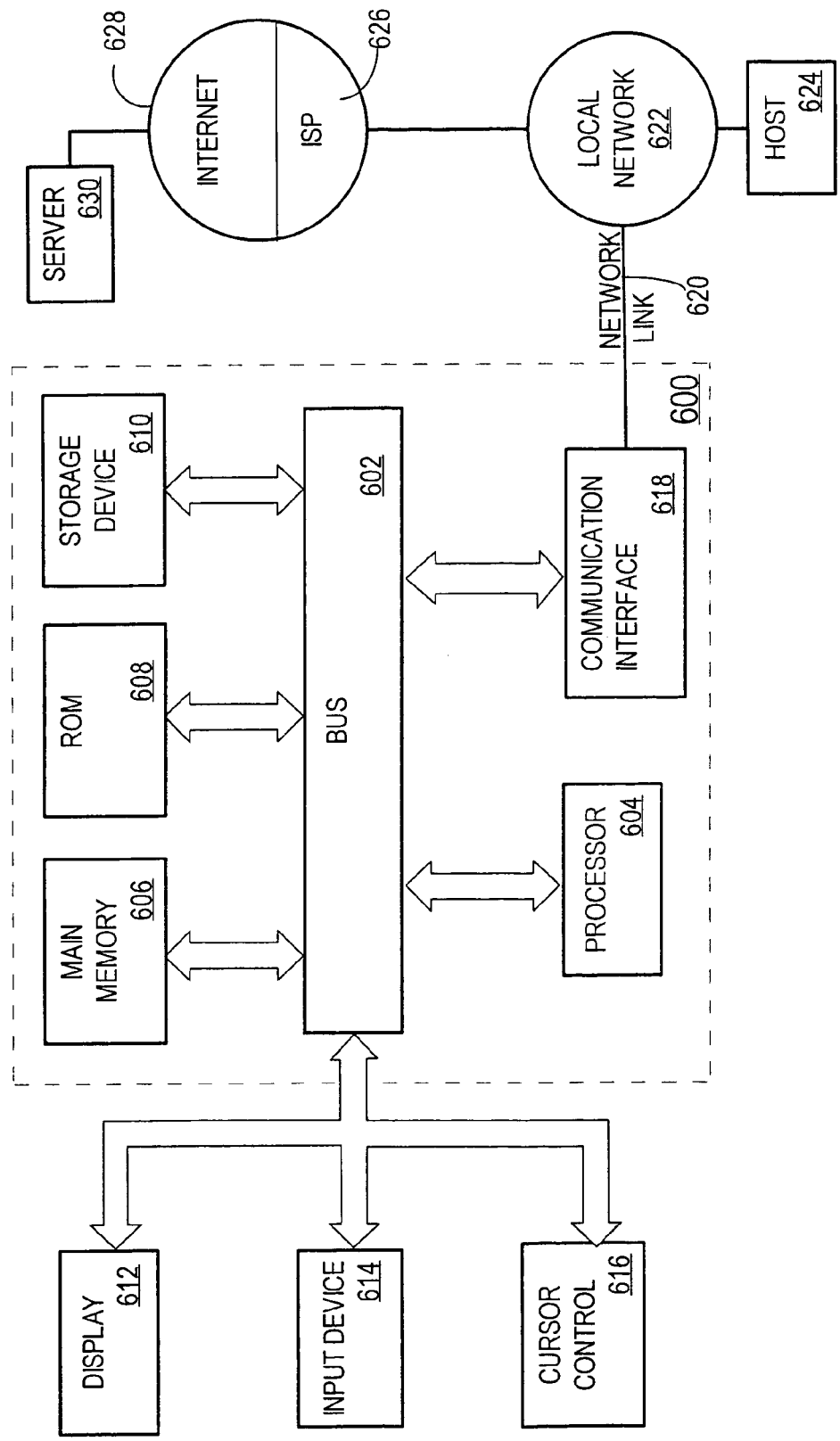
FIG. 6 is a block diagram that illustrates a computer system upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, RAM, a PROM, and EPROM, a FLASH-EPROM, any other memory chip or cartridge, a or any other medium from which a computer may read.

Various forms of machine-readable media may be involved in carrying one or more sequences of one or more instructions to processor 604 for execution. For example, the instructions may initially be carried on a magnetic disk of a remote computer. The remote computer may load the instructions into its dynamic memory and send the instructions over a telephone line using a modem. A modem local to computer system 600 may receive the data on the telephone line and use an infrared transmitter to convert the data to an infrared signal. An infrared detector may receive the data carried in the infrared signal and appropriate circuitry may place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams.

Computer system 600 may send messages and receive data, including program code, through the network(s), network link 620 and communication interface 618. In the Internet example, a server 630 may transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code.

6.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for associating data with product abstractions comprising the steps of:

maintaining a repository of previously-generated product abstractions;

maintaining data that identifies a plurality of pre-established product categories;

inspecting a first data set that includes data that corresponds to an offer to sell a particular product by a particular party, wherein the first data set is not currently matched to any product abstraction and the particular product is not currently assigned to any product category;

based on the first data set, determining whether the particular product matches any of said pre-established product categories;

in response to determining that the particular product does not match any of said pre-established product categories, determining whether to create a new product category based, at least in part, on whether similar uncategorized products have been previously encountered;

responsive to determining that a new product category should be created, (a) creating the new product category, (b) storing data that indicates that said particular product belongs to said new product category, and (c) establishing the new product category as one of said pre-established product categories;

matching said first data set with a product abstraction from said repository of previously-generated product abstractions based, at least in part, on the pre-established product category to which said particular product corresponds;

wherein the product abstraction is an electronic representation of a product and wherein the method is performed by a computer programmed to be a special purpose machine pursuant to instructions from program software.

2. The method of claim 1, wherein said offer to sell a particular product by a particular party is a first product offering of a plurality of product offerings; said product abstraction is one of a plurality of product abstractions and each product abstraction is associated with one or more product categories; and the method further comprises the steps of:

generating mapping information associating each product offering in said plurality of product offerings with one or more product abstractions in the plurality of product abstractions;

receiving a query; and generating a result set for the query based on said mapping information.

3. The method of claim 1,
wherein said offer to sell a particular product by a particular party is a first product offering of a plurality of product offerings; said product abstraction is one of a plurality of product abstractions and each product abstraction is associated with one or more product categories; and the method further comprises the steps of:
generating mapping information associating each product offering in said plurality of product offerings with one or more product abstractions in the plurality of product abstractions;
receiving a query;
generating a result set for the query based on said mapping information;
charging a party associated with a particular referenced entity in the result set based at least in part on inclusion of said particular referenced entity in said result set; and
determining how much to charge the party based, at least in part, on a product category associated with said referenced entity.

4. The method of claim 2, wherein the result set is a list of one or more references.

5. The method of claim 4, wherein each reference of the list of references corresponds to a referenced entity, and wherein each referenced entity associated with each reference in the list of references is one of a product abstraction, a merchant, a product offering or a product category.

6. The method of claim 1, wherein the step of matching said first data set with a product abstraction further comprises the steps of:
determining that said first data set does not correspond to any product abstractions in the repository of previously-generated product abstractions that are associated with said corresponding product category;
generating a new product abstraction based on said first data set; and
matching said first data set with said new product abstraction.

7. The method of claim 1, wherein the step of creating the new product category further comprises the steps of:
generating the new product category based on said first data set and said similar uncategorized products; and
associating said first data set with said new product category.

8. The method of claim 2, wherein said result set includes a particular reference to a particular referenced entity, and wherein the method further comprises the steps of:
providing said one or more result sets to one or more users; and
monitoring the number of times that said one or more users select said particular reference associated with said particular referenced entity from said one or more result sets.

9. The method of claim 8, further comprising the step of charging a party associated with said particular referenced entity a fee based on the number of times said one or more users select said particular reference.

10. The method of claim 2, wherein the step of generating a result set further comprises generating a page that contains one or more sponsored references and one or more unsponsored references, wherein a sponsored reference is a first reference associated with a first referenced entity, and for which a first party associated with said first referenced entity is charged for each inclusion of said first reference in said one or more result sets, and wherein an unsponsored reference is a second reference for which no party will be charged for each inclusion of said second reference in said one or more result sets.

11. The method of claim 2, wherein the step of generating a result set further comprises generating a page that contains one or more attributes of one or more products in one or more particular product categories.

12. The method of claim 2, wherein the step of generating a result set further comprises generating a page which contains a comparison of one or more attributes of one or more entities that are referenced in the page with one or more attributes of one or more other entities that are referenced in the page.

13. The method of claim 8, further comprising the step of providing, to a party associated with said particular referenced entity, activity reports based on information generated during the step of monitoring the number of times said one or more users selects the reference associated with said particular referenced entity.

14. The method of claim 2, wherein said list of references comprises a plurality of references, and wherein the method further comprises the steps of
displaying said plurality of references in a particular order within said result set,
determining said particular order based on a set of aspects of each reference in said plurality of references and a set of aspects of each referenced entity to which each reference in said plurality of references refers, wherein the aspects comprise one or more of likelihood that a reference satisfies a query, existence of sponsorship, and cost of sponsorship.

15. The method of claim 2, wherein the step of generating a result set further comprises the steps of:
applying a similarity measure between one or more aspects of a particular reference and one or more aspects of a plurality of other references, wherein said aspects include one or more aspects of the reference and one or more aspects of the referenced entity; and
selecting which references to include in said result set based on said similarity measure.

16. The method of claim 1, wherein the step of matching said first data set with a product abstraction comprises the step of comparing an identifier corresponding to said product abstraction to an identifier corresponding to said first data set.

17. The method of claim 16, wherein the identifier is chosen from the group consisting of Universal Product Code, International Standard Book Number, manufacturer, manufacturer's part number, and model number.

18. The method of claim 1, wherein the step of based on the first data set, determining whether the particular product matches any of said pre-established product categories comprises the step of comparing an identifier corresponding to one or more of said pre-established product categories to an identifier corresponding to said first data set.

19. The method of claim 18, wherein the identifier is chosen from the group consisting of Universal Product Code, International Standard Book Number, manufacturer, manufacturer's part number, and model number.

20. The method of claim 1, wherein each product category maps to one or more product abstractions, merchants, product offerings, and other product categories.

21. The method of claim 1, further comprising the step of obtaining product information for said first set of data by extracting the product information from an electronic catalog.

22. The method of claim 1, further comprising the step of obtaining product information for said first set of data by crawling web sites over the Internet.

23. The method of claim 1,
wherein said offer to sell a particular product by a particular party is a first product offering of a plurality of product offerings; said product abstraction is one of a plurality of abstractions and each product abstraction is associated with a one or more product categories; and the method further comprises the steps of:
generating mapping information associating each product offering in said plurality of product offerings with one or more product abstractions in the plurality of product abstractions; and
revising said mapping information, wherein the step of revising comprises one or more of the following steps:
changing a mapping between a data set and a product offering;
changing a mapping between a first product category and a second product category; and
changing a data set.

24. A machine-readable storage medium storing one or more sequences of instructions for assigning data to product abstractions, wherein said instructions when executed by one or more processors, cause the one or more processors to perform the steps of:
maintaining a repository of previously-generated product abstractions;
maintaining data that identifies a plurality of pre-established product categories;
inspecting a first data set that includes data that corresponds to an offer to sell a particular product by a particular party, wherein the first data set is not currently matched to any product abstraction and the particular product is not currently assigned to any product category;
based on the first data set, determining whether the particular product matches any of said pre-established product categories;
in response to determining that the particular product does not match any of said pre-established product categories, determining whether to create a new product category based, at least in part, on whether similar uncategorized products have been previously encountered;
responsive to determining that a new product category should be created, (a) creating the new product category, (b) storing data that indicates that said particular product belongs to said new product category, and (c) establishing the new product category as one of said pre-established product categories;
matching said first data set with a product abstraction from said repository of previously-generated product abstractions based, at least in part, on the pre-established product category to which said particular product corresponds;
wherein the product abstraction is an electronic representation of a product.

25. The machine-readable storage medium of claim 24, wherein said offer to sell a particular product by a particular party is a first product offering of a plurality of product offerings; said product abstraction is one of a plurality of product abstractions and each product abstraction is associated with one or more product categories; and the instructions include instructions for:
generating mapping information associating each product offering in said plurality of product offerings with one or more product abstractions in the plurality of product abstractions;
receiving a query; and
generating a result set for the query based on said mapping information.

26. The machine-readable storage medium of claim 24,
wherein said offer to sell a particular product by a particular party is a first product offering of a plurality of product offerings; said product abstraction is one of a plurality of product abstractions and each product abstraction is associated with one or more product categories; and the instructions also include instructions for performing the steps of:
generating mapping information associating each product offering in said plurality of product offerings with one or more product abstractions in the plurality of product abstractions;
receiving a query;
generating a result set for the query based on said mapping information;
charging a party associated a with a particular referenced entity in the result set based at least in part on inclusion of said particular referenced entity in said result set; and
determining how much to charge the party based, at least in part, on a product category associated with said referenced entity.

27. The machine-readable storage medium of claim 25, wherein the result set is a list of one or more references.

28. The machine-readable storage medium of claim 27, wherein each reference of the list of references corresponds to a referenced entity, and wherein each referenced entity associated with each reference in the list of references is one of a product abstraction, a merchant, a product offering or a product category.

29. The machine-readable storage medium of claim 24, wherein the step of matching said first data set with a product abstraction further comprises the steps of:
determining that said first data set does not correspond to any product abstractions in the repository of previously-generated product abstractions that are associated with said corresponding product category;
generating a new product abstraction based on said first data set; and
matching said first data set with said new product abstraction.

30. The machine-readable storage medium of claim 24, wherein the step of creating the new product category further comprises the steps of:
generating the new product category based on said first data set and said similar uncategorized products; and
associating said first data set with said new product category.

31. The machine-readable storage medium of claim 25, wherein said result set includes a particular reference to a particular referenced entity, and the instructions include instructions for:
providing said one or more result sets to one or more users; and
monitoring the number of times that said one or more users select said particular reference associated with said particular referenced entity from said one or more result sets.

32. The machine-readable storage medium of claim 31, wherein the instructions include instructions for charging a party associated with said particular referenced entity a fee based on the number of times said one or more users select said particular reference.

33. The machine-readable storage medium of claim 25, wherein the step of generating a result set further comprises generating a page that contains one or more sponsored references and one or more unsponsored references, wherein a sponsored reference is a first reference associated with a first referenced entity, and for which a first party associated with said first referenced entity is charged for each inclusion of said first reference in said one or more result sets, and wherein an unsponsored reference is second reference for which no party will be charged for each inclusion of said second reference in said one or more result sets.

34. The machine-readable storage of medium claim 25, wherein the step of generating a result set further comprises generating a page that contains one or more attributes of one or more products in one or more particular product categories.

35. The machine-readable storage of medium claim 25, wherein the step of generating a result set further comprises generating a page which contains a comparison of one or more attributes of one or more entities that are referenced in the page with one or more attributes of one or more other entities that are referenced in the page.

36. The machine-readable storage medium claim 31, wherein the instructions include instructions for providing, to a party associated with said particular referenced entity, activity reports based on information generated during the step of monitoring the number of times said one or more users selects the reference associated with said particular referenced entity.

37. The machine-readable storage medium claim 25, wherein said list of references comprises a plurality of references, and wherein the instructions include instructions for:
 displaying said plurality of references in a particular order within said result set,
 determining said particular order based on a set of aspects of each reference in said plurality of references and a set of aspects of each referenced entity to which each reference in said plurality of references refers, wherein the aspects comprise one or more of likelihood that a reference satisfies a query, existence of sponsorship, and cost of sponsorship.

38. The machine-readable storage medium of claim 25, wherein the step of generating a result set further comprises the steps of:
 applying a similarity measure between one or more aspects of a particular reference and one or more aspects of a plurality of other references, wherein said aspects include one or more aspects of the reference and one or more aspects of the referenced entity; and
 selecting which references to include in said result set based on said similarity measure.

39. The machine-readable storage medium of claim 24, wherein the step of matching said first data set with a product abstraction comprises the step of comparing an identifier corresponding to said product abstraction to an identifier corresponding to said first data set.

40. The machine-readable storage of medium claim 39, the identifier is chosen from the group consisting of Universal Product Code, International Standard Book Number, manufacturer, manufacturer's part number, and model number.

41. The machine-readable storage medium of claim 24, wherein the step of based on the first dataset, determining whether the particular product matches any of said pre-established product categories comprises the step of comparing an identifier corresponding to one or more said pre-established product categories to an identifier corresponding to said first data set.

42. The machine-readable storage medium of claim 41, wherein the identifier is chosen from the group consisting of Universal Product Code, International Standard Book Number, manufacturer, manufacturer's part number, and model number.

43. The machine-readable storage medium of claim 24, wherein each product category maps to one or more product abstractions, merchants, product offerings, and other product categories.

44. The machine-readable storage medium of claim 24, the instructions include instructions for obtaining product information for said first set of data by extracting the product information from an electronic catalog.

45. The machine-readable storage medium of claim 24, the instructions include instructions for obtaining product information for said first set of data by crawling web sites over the Internet.

46. The machine-readable storage medium of claim 24,
 wherein said offer to sell a particular product by a particular party is a first product offering of a plurality of product offerings; said product abstraction is one of a plurality of product abstractions and each product abstraction is associated with a one or more product categories; and the instructions include instructions for:
 generating mapping information associating each product offering in said plurality of product offerings with one or more product abstractions in the plurality of product abstractions; and
 revising said mapping information, wherein the step of revising comprises one or more of the following steps:
  changing a mapping between a data set and a product offering;
  changing a mapping between a first product category and a second product category; and
  changing a data set.

\* \* \* \* \*